May 21, 1957  C. W. HEATHCOTE  2,792,641
APPARATUS FOR THE TREATMENT OF GRANULATED AND FINE MATERIALS
Filed July 13, 1955  5 Sheets-Sheet 4
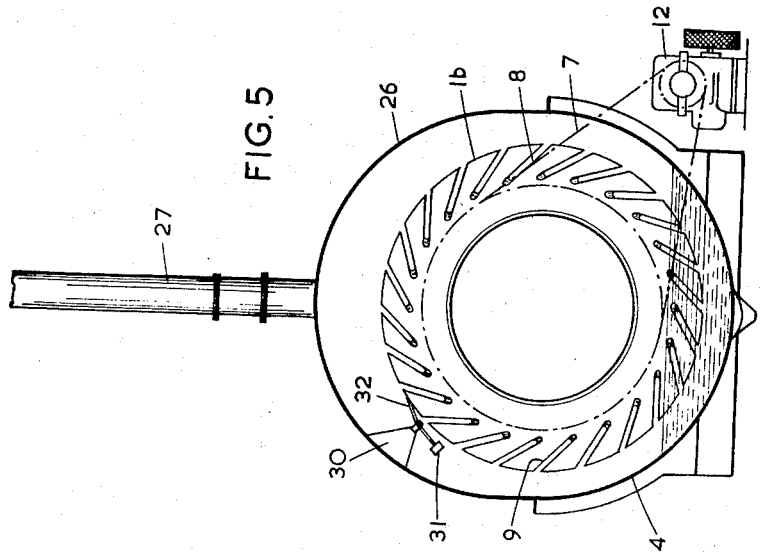
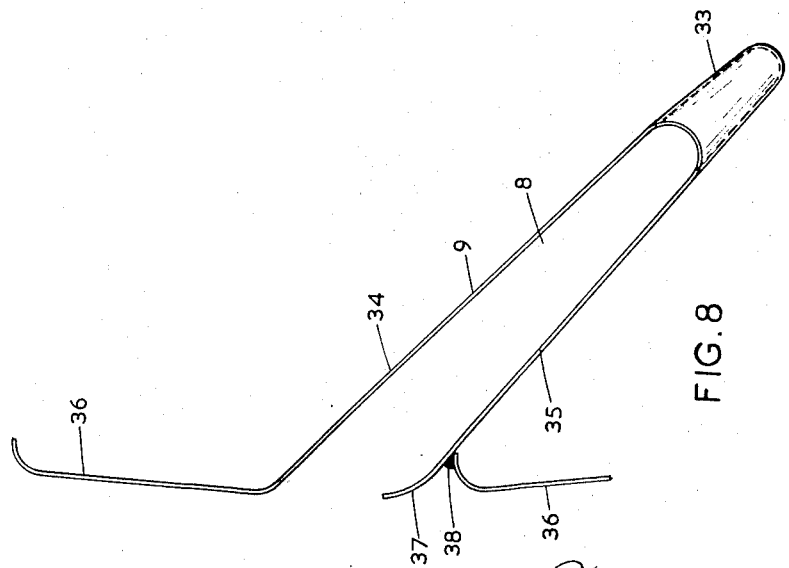

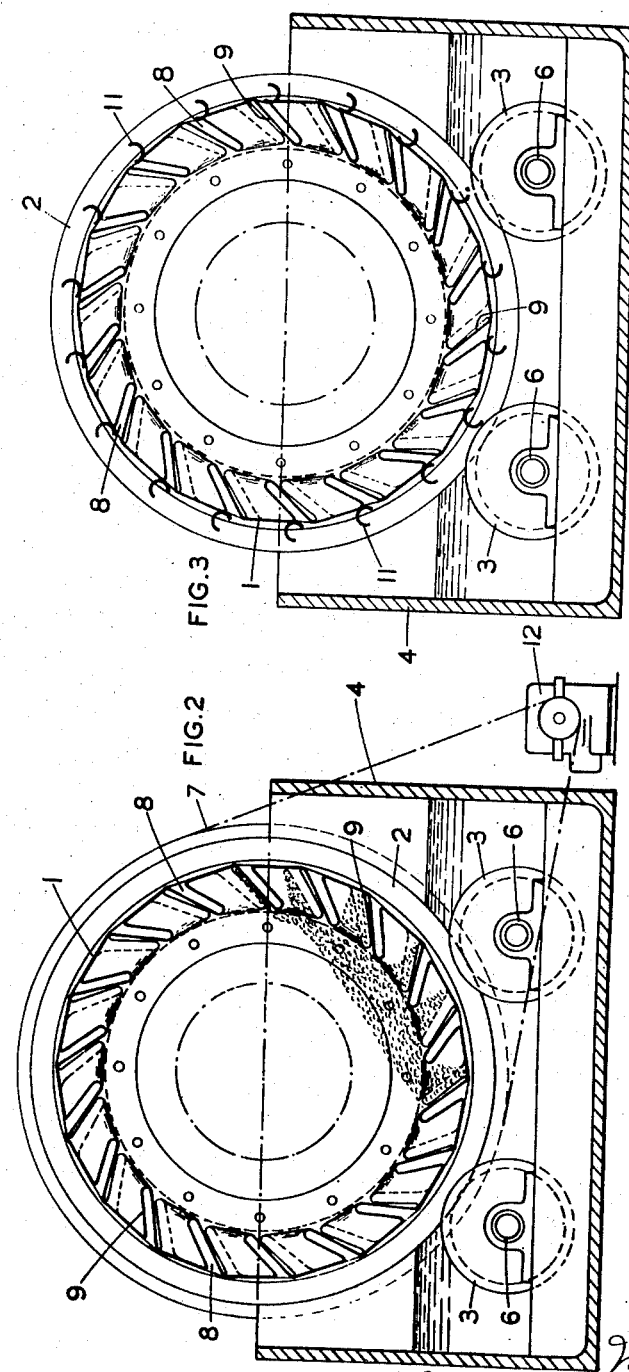

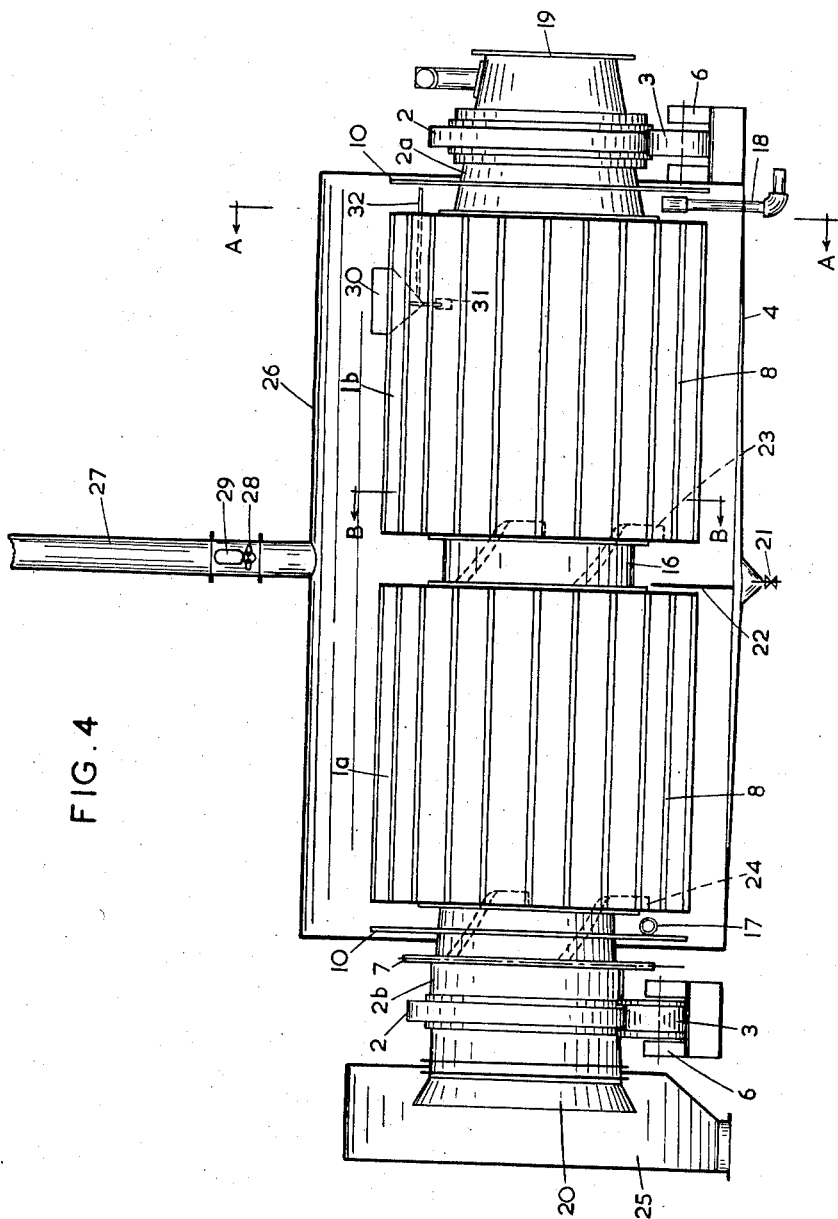

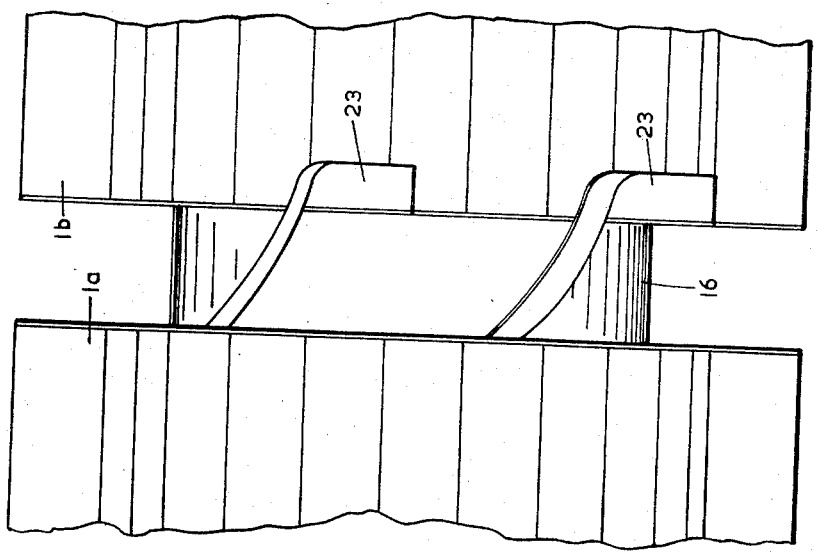
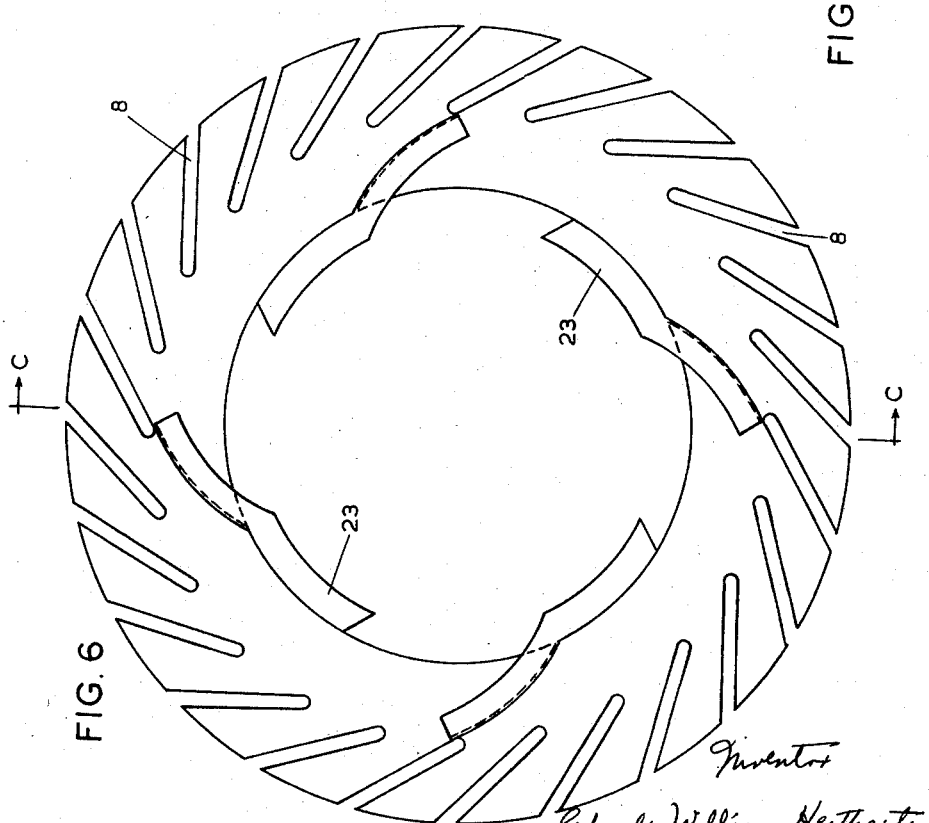

United States Patent Office 2,792,641
Patented May 21, 1957

2,792,641

APPARATUS FOR THE TREATMENT OF GRANULATED AND FINE MATERIALS

Charles William Heathcote, Harrow, England, assignor to Dunford & Elliott Process Engineering Limited, London, England, a British company Application July 13, 1955, Serial No. 521,864

8 Claims. (Cl. 34—85)

The invention relates to apparatus for the cooling, heating or drying of granular and fine materials, for example, powders.

According to the invention, the materials to be heated, dried or cooled or otherwise treated are caused to pass through a drum rotatable in a bath of heating or cooling medium, means being provided on the drum to cause the medium continuously to flow along those outer surfaces of the drum on the inner surfaces of which the material is supported.

According to the invention furthermore, hollow vanes or ledges are provided on the outer peripheral surface of the drum to extend lengthwise and horizontally of the drum and to project into the drum to present on the outer periphery grooves or channels along which the heating or cooling medium flows respectively to heat or cool the material inside the drum and to serve on the inner periphery of the drum as the means for causing the material to be moved from the inlet to the outlet of the drum, and being for the purpose curved as for example in helical form around the drum, or otherwise inclined.

According to the invention furthermore, the drum may be mounted at an inclination or tapered horizontally (the taper being formed by the feed end having a smaller diameter than the discharge end) to cause the material to be fed slowly from the inlet at one end of the drum to the outlet at the other end, and to provide the hydraulic head for the passage of the heating or cooling medium to enable it to flow along the vanes or ledges, and the vanes or ledges provided to run parallel to the axis of the drum.

According to the invention furthermore, the drum may be provided as two or more end sections connected together by an interposed middle concentrically mounted part of reduced cross-section and having longitudinal grooves formed parallel with the axis in the periphery thereof, which grooves may be formed to a progressively increasing depth from the discharge end for the granular material to the inlet at the opposite end of the drum, so as to cause the cooling medium to flow in the direction opposite to that of the flow of the granular material, the flow of the granular material being also assisted in its movement from the inlet to the discharge end of the drum, by the tapering of the grooves.

According to the invention furthermore, a hood having a flue and/or suction fan may be provided wholly or partially to cover the drum so as to carry away the vapour that is evolved on evaporation of the film of liquid on the external surface of the drum.

According to the invention furthermore, where the material passed through the drum is to be cooled using water or other liquid as the cooling medium, means may be provided to raise the liquid from the trough in which the drum rotates, and to deposit it in the vanes or ledges on the outer periphery of the drum. Such means may comprise scoops extending lengthwise of the drum, one scoop being provided for each groove or channel formed by the ledges or vanes. The scoops may be provided in two sections, split for example at a mid-position, so that in the first section the liquid runs in one direction along the drum on one side, whilst in the second section the liquid is retained in the scoop until the cylinder has passed through a top dead centre position and is then discharged into the discharge ends of the channels to flow along the ledges or vanes in the opposite direction.

According to the invention furthermore, where a cooling effect is required, this is increased by the provision at one or other end of the drum of means such as a chimney and/or a fan to create an induced draught and to cause a movement of air through the drum which not only assists in the cooling action, but also assists in removing any moisture which may have been formed in the cooling of the material.

According to the invention furthermore, cooling or heating medium may be circulated as it passes from the channels on the outer periphery of the drum, in an open or closed circuit, to an external cooler or heater provided respectively to heat or cool the liquid as it returns from the sump and before it is pumped back on to the surface of the drum.

The invention is diagrammatically illustrated by way of example in the accompanying drawings in which:

Figure 2 is a corresponding transverse sectional elevation on an enlarged scale;

Figure 3 is a corresponding transverse sectional elevation of a modified construction on an enlarged scale;

Figure 4 is a longitudinal section showing the drum in elevation;

Figure 5 is a section on the line A—A of Figure 4;

Figure 6 is an enlarged section on the line B—B of Figure 4;

Figure 7 is a section on the line C—C of Figure 6; and

Figure 8 is an enlarged section showing a modification of the grooves.

Figure 1:
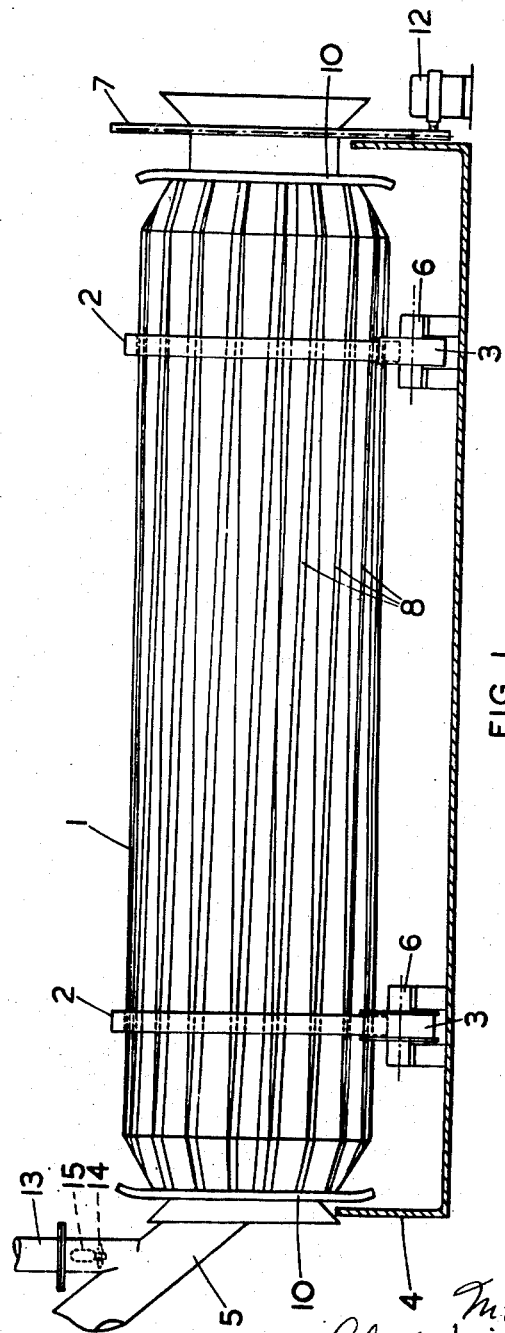
Figure 1 is a side elevation of a rotary cooler for fine and granulated materials.

In carrying the invention into effect according to the construction illustrated in Figures 1 and 2 of the accompanying drawings in the application of the invention to apparatus for cooling granulated sugar, the apparatus comprises a horizontally disposed hollow drum 1 mounted by means of rings 2 on pairs of rollers 3 in a trough 4. The rollers are mounted in resin-impregnated fabric bushings and water-lubricated. Alternatively the rollers 3 may be mounted externally of the trough, in which case the roller bearings would be grease-lubricated.

At one end of the drum is mounted a feed-chute 5 which projects into the open end of the drum 1 and through which the hot granulated sugar is passed. The drum 1 may be mounted in the bearings 6 horizontally or at an inclination. The drum 1 is rotated by means of a chain and sprocket drive 7 from a motor 12. The drive 7 may be connected to the drum at either end or at any intermediate position as required. The peripheral surface of the drum 1 is formed on the outer surface with grooves 8 which extend at an angle on the periphery of the drum 1 and are of considerable depth compared with the width, and serve in the rotation of the drum 1 to scoop up water which then flows lengthwise of each groove 8 towards one end of the drum 1 back into the trough 4, or into a separate trough or hopper (not shown) from which it may be run to waste or used for other purposes. The grooves 8 extend inwardly at an angle so as to present projecting portions 9 on the inner surface, on which the sugar rests at the angle of repose in the drum 1, the grooves thus affording a maximum extent of contact between the sugar and the liquid heat-absorber medium flowing in the grooves on the outer periphery of the drum 1 and serving to move the sugar forwardly in the rotation of the drum.

In order to assist in the cooling effect, an air flow outlet 13 may be provided advantageously in the feed-chute 5 which may be formed as a chimney and which may be provided with a controlled damper and/or a fan 14 driven by a motor 15, so that the sugar is cooled not only by the water flowing through the grooves on the outer periphery of the drum, but also by the current of air passing centrally through the drum, which also serves to assist the removal of moisture from the sugar. The ends of the drum 1 are provided with annular water baffles 10 to direct the flow of water passing downwardly through the grooves back into the trough 4, or to the discharge trough or hopper as hereinbefore described.

In Figure 3 is shown a modified construction in which scoops in the form of gutters 11 are provided to extend lengthwise of the grooves 8 for the purpose of assisting in scooping up water into the grooves in the rotation of the drum 1.

In one example of carrying out the invention in the application to the cooling of granulated sugar, a quantity of sugar was pre-heated and continuously passed into the cooler as hereinbefore described at an approximate rate of 162 lbs. per hour. The test lasted for a period of two hours during which the following data was recorded:

Speed of drum_____ R. P. M__ 4
Bulk density of the sugar_____ lbs. per cu. ft__ 54
Treatment time _____ minutes__ 20

The holding capacity of the cooler was approximately 1 cu. ft.

With length of running approximately one hour in each case, the following temperatures were recorded.

| Temperature of ingoing material | Temperature of material | Ambient Temperature, °C. | Water Temperature, °C. |
|---|---|---|---|
| 54° C | At discharge 15° C., at 1 ft. F. E. cool to touch. | 18 | 14 |
| 80° C | At 1 ft. F. E. 36° C<br>At 2 ft. F. E. 27° C<br>At 3 ft. F. E. 22° C<br>At 4 ft. F. E. 19° C<br>At 5 ft. F. E. 19° C<br>At Discharge 19° C | 23 | 18 |

In the modified construction illustrated in Figures 4 to 7 of the accompanying drawings, the drum is formed as two cylindrical end parts 1a and 1b of identical shape and form, connected by an intermediate middle, advantageously cylindrical, part 16 of reduced cross-section concentrically mounted with respect to the parts 1a and 1b. The intermediate portion 16 of the drum may be formed as a conical section, thereby assisting in the build up of the material in the drum section 1a. The parts 1a and 1b are provided at their ends with cylindrical extension parts 2a and 2b through which the material to be cooled is respectively fed into and discharged from the drum.

The parts 2a, 2b are provided with peripheral rings 2 welded onto the said parts, the rings running on pairs of grooved rollers 3 in bearings 6.

The drum is mounted with the lower part immersed within a tank 4 having an inlet 17 for the cooling water at one end and an outlet 18 at the other end. The material to be cooled is passed into the drum through an inlet 19 in the extension part 2a and is discharged through an outlet 20 in the extension part 2b. The drum may be inclined to feed the material from one end to the other of the parts 1a, 1b but it has been found that adequate movement of the material can be maintained by the build-up at the feed end of each drum section and the angle and taper of the ledges which, in the rotation of the drum, moves the material slowly towards the discharge end. The member 16 is provided of a smaller diameter to that of the drum sections so that an artificial depth of material is built-up at the discharge end of the drum section 1a in order to provide an adequate head of material at the commencement of the drum section 1b.

The tank 4 is formed to taper towards the middle position and is provided with a draw-off cock 21. Extending across the tank 4 is a weir 22 which projects upwardly between the two inner ends of the drum immediately below the part 16 so that the warm water discharge from the grooves 8 of section 1a passes over the weir into the warm water section of the tank 4, so providing continuous decantation of the warm water in the section, and obviating the mixing of the warm water with the cold feed.

The peripheral surface of each drum is formed with a series of parallel grooves 8 along which the cooling water flows and, which extend inwardly at an angle internally of the drum to form the surfaces 9 over which the material to be cooled passes in its flow or movement from one end of the drum to the other. The grooves 8 are formed parallel but are of progressively increasing depth from the discharge end of the apparatus to the feed end, that is to say, in a direction opposite to the direction of flow of the material to be cooled. The outer ends of each groove 8 may be formed with scoops 11 in the manner illustrated in Figure 3, to facilitate the scooping up into the grooves 8 of an adequate supply of water from the tank 4 in the rotation of the drum.

The drum is rotated by a motor 12 through chain gearing 7 as illustrated in Figure 5, so that the material is caused to flow steadily and slowly from the feed-end of the drum to the discharge end, by virtue of the cone effect in the interior of the drum due to the tapering of the inwardly projecting parts formed by the outer channels for the cooling liquid.

Thus it will be understood that the water in the grooves 8 of the drum flows in the opposite direction to the direction of flow of the material, so that the material which is at its hottest on entering the drum is first cooled by the already partly warmed water, the material as it leaves the end of the drum being finally cooled by the completely cold water entering the tank 4 at 17. Cooling in this way is found to be the most effective.

To enable the material to pass across the part 16 of reduced cross-section, there are provided members 23 of double arcuate form extending across the part 16, the members 23 in the rotation of the drum dipping into the material in one end section of the drum to raise a portion thereof and in the continued rotation of the drum causing a sliding of the material laterally across the width of the part 16 of reduced cross-section, into the other section of the drum. Members 24 comparable to the members 23 may also be provided at the discharge end of the drum section 1b for the purpose of raising the cooled material from the drum and passing it to a discharge hood 25.

The drum is advantageously formed with a hood or canopy 26 having a flue 27 with draught regulating means consisting of a fan 28 driven by a motor 29 extracting the vapour evolved in the evaporation of the film of liquid on the peripheries of the drum during operation.

It has been found that materials of the character of titanium tend to stick to the inner surface of the drum and to avoid this disadvantage a rapper gear, comprising a supporting plate 30, a hammer 31 and an arm 32 is provided on the inner face of the exhaust hood or canopy 26, so that on rotation of the drum the arm 32 alternately lifts and releases the hammer 31 to cause it to hammer on the external face of the drum to dislodge any adhering material.

At the material discharge end of the drum is mounted a hood 25 to collect and guide the treated material into a discharge hopper or the like.

The channels 8 in the walls of this drum may be constructed in the manner illustrated in Figure 8 of the accompanying drawings. The channels 8 are of a progressively increasing depth from one end of the channel to the other, as indicated at 33 and having one longer wall section 34, and a shorter wall section 35. The section 34 is provided with a curved end 36 and the section 35 with an inwardly turned lip 37 to which the end 36 is secured, as by welding, at 38.

While the invention has been described particularly with reference to the cooling of a fine granulated material, the drum may also be used without modification for the heat treatment of a material by passing a heating medium such as a hot liquid through the outer peripheral grooves in the drum and by passing hot air through the inside of the drum.

The angle of the vanes or ledges is determined so that, in the rotation of the drum, a small proportion of the material is gathered from the base of the bed and lifted to the top of the bed, whence it slides on to the top surface of the bed and gradually down the face. The angle of the flight or of the vane or ledge is therefore determined to ensure this movement. Thus, where a certain material has an angle of repose of 35° to the horizontal, vanes or ledges having an angle to the horizontal axis through the centre of the cylinder of 45° at the feed end, and 60° at the discharge end will operate on rotation of the cylinder to cause a forward movement of the material and will also discharge the material on top of the bed. If the angle of the vanes or ledges is made a little greater, for example, 50° and 65° respectively, the material is lifted above the top face of the bed and caused to flow slowly over the surfaces, which slow movement is advantageous, particularly with some materials, in that it allows a better contact of the material with the air passing through the cylinder.

The drum may be partially submerged in the trough up to, for example, one third of its diameter in water or other coolant. In addition, or alternatively, the outside face of the drum may be sprayed or covered with the liquid, in which case means for effecting simple circulation of the liquid from the trough to the face of the cooler may be utilised by pumping or other means. The use of pressure for the coolant can be utilised to give a refrigerating effect to the surface of the cooler shell.

The feed and discharge ends of the drum are partially enclosed, with openings at the axis at one end for the passage in of the material to be cooled, and at the other end for the discharge of the cooled material.

The construction of cooling drum according to the invention provides for ease of cleaning, internally and externally, the water passages being open to the outside.

At the same time, a large area of water-cooled surface is presented to the material being cooled, which is constantly being moved as a bed in the spiral form from the feed to discharge end, so that all the particles of material are subjected to even treatment and contact with the cooling surfaces and ledges.

The intake and discharge of the material may be regulated as by means of vanes or weir plates in known manner, thus controlling the depth of material inside the drum, and consequently the holding capacity of the drum and the period of retention in the drum. The retention period is calculated as a function of the kind of material being cooled, and the throughput of the cooler.

The flow of water through the slots may also be controlled in any convenient manner, as by restriction at the ends, so that the contact time of the water sweeping through the slots is regulated.

Thus it will be understood that there is minimum differential movement between the metal surface of the drum and the material passing through and substantially without cascading, thus reducing to a minimum degradation of the material and wear between abrasive materials and the surface of the drum.

I claim:

1. Apparatus for the treatment of granular materials including in combination a rotatable drum, means for rotating the drum, a bath for containing a liquid heat transfer medium and in which the drum rotates, an inlet for granular material at one end of the drum, an outlet for the granular material at the other end of the drum, a series of hollow channels formed in the outer wall of the drum, said channels being open at the exterior of the drum and closed at their interior edges and extending longitudinally of the drum to form inwardly directed hollow projections into and out of which the liquid heat transfer medium may readily flow as the drum is rotated, and an inlet and outlet for gas at opposite ends of the drum.

2. Apparatus according to claim 1, in which the channels increase progressively in depth from one end of the drum to the other.

3. Apparatus according to claim 1, including means for spraying the unsubmerged surface of the drum with the heat transfer medium.

4. Apparatus according to claim 1, including means for rapping the drum for loosening material caked on the walls of the drum.

5. Apparatus as claimed in claim 1 in which the rotatable drum is formed in two end sections connected by an intermediate hollow concentric part of reduced diameter and a transverse weir is positioned in the bath below the intermediate part of the drum.

6. Apparatus according to claim 5, in which means are provided to cause the heat transfer medium to flow through the bath in a direction opposite to the flow of the granular material through the drum.

7. Apparatus according to claim 5, in which the channels increase progressively in depth from one end of a drum section to the other.

8. Apparatus according to claim 5, including lifting members for passing the material through the intermediate concentric part from one end section of the drum to the other end section.

References Cited in the file of this patent

UNITED STATES PATENTS

| | | |
|---|---|---|
| 366,672 | Kreps | July 19, 1887 |
| 674,309 | Waterhouse | May 14, 1901 |
| 749,340 | Timby | Jan. 12, 1904 |
| 1,064,263 | Wallos | June 10, 1913 |
| 1,768,777 | Moller | July 1, 1930 |
| 1,799,649 | Schenck | Apr. 7, 1931 |
| 1,853,691 | Lissauer et al. | Apr. 12, 1932 |
| 2,020,960 | Pehrson et al. | Nov. 12, 1935 |
| 2,212,560 | Folley | Aug. 27, 1940 |

FOREIGN PATENTS

| | | |
|---|---|---|
| 727,681 | France | Apr. 4, 1932 |